(12) United States Patent
Staubach et al.

(10) Patent No.: US 6,669,445 B2
(45) Date of Patent: Dec. 30, 2003

(54) ENDWALL SHAPE FOR USE IN TURBOMACHINERY

(75) Inventors: J. Brent Staubach, Colchester, CT (US); Joel H. Wagner, Wethersfield, CT (US); Andrew S. Aggarwala, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 4 days.

(21) Appl. No.: 10/093,989

(22) Filed: Mar. 7, 2002

(65) Prior Publication Data
US 2003/0170124 A1 Sep. 11, 2003

(51) Int. Cl.$^7$ .................................................. F01D 5/12
(52) U.S. Cl. .................... 416/193 A; 416/248; 415/914
(58) Field of Search ............................ 416/193 A, 248, 416/219 R, 220 R, 234, 239; 415/914, 181, 191, 192, 195, 210.1, 208.1

(56) References Cited

U.S. PATENT DOCUMENTS

| 2,735,612 | A | * | 2/1956 | Hausmann | |
| 4,194,869 | A | * | 3/1980 | Corcokios | 415/216 |
| 4,465,433 | A | * | 8/1984 | Bischoff | 416/223 A |
| 5,397,215 | A | * | 3/1995 | Spear et al. | 415/191 |
| 5,466,123 | A | * | 11/1995 | Rose | 415/182.1 |
| 5,554,000 | A | * | 9/1996 | Katoh et al. | 415/208.2 |
| 6,017,186 | A | * | 1/2000 | Hoeger et al. | 415/181 |
| 6,283,713 | B1 | * | 9/2001 | Harvey et al. | 416/193 A |
| 6,471,474 | B1 | * | 10/2002 | Mielke et al. | 415/199.4 |
| 6,478,539 | B1 | * | 11/2002 | Trutschel | 415/223 R |
| 6,511,294 | B1 | * | 1/2003 | Mielke et al. | 416/193 A |
| 6,524,070 | B1 | * | 2/2003 | Carter | 416/193 A |

* cited by examiner

Primary Examiner—Edward K. Look
Assistant Examiner—J. M. McAleenan
(74) Attorney, Agent, or Firm—Bachman & LaPointe, P.C.

(57) ABSTRACT

The present invention relates to an endwall shape for reducing shock strength on transonic turbomachinery airfoils which define at least one flow passage. The endwall shape includes a non-axisymmetric trough which extends from a leading portion of the at least one flow passage to a point near a trailing edge portion of the at least one flow passage.

7 Claims, 4 Drawing Sheets

ENDWALL SHAPE FOR USE IN TURBOMACHINERY

BACKGROUND OF THE INVENTION

The present invention relates to an endwall shape to be used with rotating turbomachinery to reduce shock strength on transonic turbomachinery airfoils.

In rotating turbomachinery, such as the compressor and turbine stages of jet engines, flow passages are defined by airfoil surfaces and an inner endwall. During operation, shock waves occur near the inner endwall. The presence of these shock waves create pressure losses where they interact with the inner endwall. Hence, it is very desirable to reduce the shock/endwall interaction losses which occur during transonic fluid flow through the passages.

SUMMARY OF THE INVENTION

Accordingly, it is an object of the present invention to provide an endwall having a non-axisymmetric trough which reduces shock/endwall interaction losses.

It is a further object of the present invention to provide a non-axisymmetric inner endwall trough which enables a reduction in cross passage pressure distortion to be realized.

The foregoing objects are attained by the endwall shape of the present invention.

In accordance with the present invention, an endwall shape for reducing shock strength on transonic turbomachinery airfoils forming at least one flow passage comprises a non-axisymmetric trough extending from a leading portion of the at least one flow passage to a point near a trailing edge portion of the at least one flow passage. As used herein, the term non-axisymmetric means that the trough does not solely extend in either an axial direction or a circumferential or radial direction. Rather, the trough simultaneously extends in both the axial direction and the circumferential direction.

Other details of the endwall shape of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
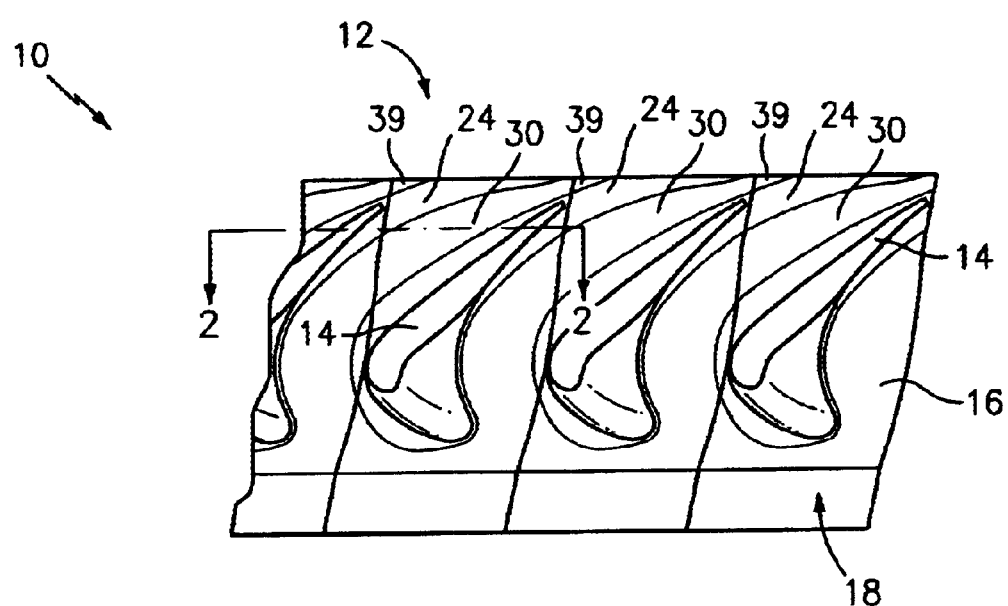
FIG. 1 is a top view of a portion of a turbomachinery flow directing assembly having a contoured inner endwall in accordance with the present invention.

Referring now to the drawings, FIG. 1 illustrates a portion of a flow directing assembly 10 used in a rotary machine, such as a compressor stage or a high pressure turbine stage of a turbine engine. The flow directing assembly 10 has a plurality of blades or vanes 12 with each blade or vane 12 having an airfoil 14 and a platform 16 which forms part of an inner endwall 18. Each airfoil 14 has a pressure side 20, a suction side 22, a leading edge 23 and a trailing edge 26. Adjacent ones of the airfoils 14 in the assembly 10 form fluid flow passages 24. Typically, the platforms 16 are shaped in a way (see dotted lines in FIGS. 2 and 3) which leads to a full span shock emanating from the trailing edge 26 of each airfoil 14. This results in a large variation in Mach number in the transverse direction near a platform downstream location aft of the trailing edge 26, which in turn contributes to pressure losses and decreases in efficiency.

In accordance with the present invention, the trailing edge portion 28 of each platform 16 is provided with a non-axisymmetric trough 30. Each trough 30 extends from a leading edge portion 32 of a respective flow passage 24 to a point 34 near a trailing edge portion of the flow passage 24. As can be seen from FIG. 1, the trough 30 extends neither in just an axial direction or just a circumferential direction. Rather, the trough 30 extends simultaneously in both an axial direction and a circumferential direction.

Figure 2:
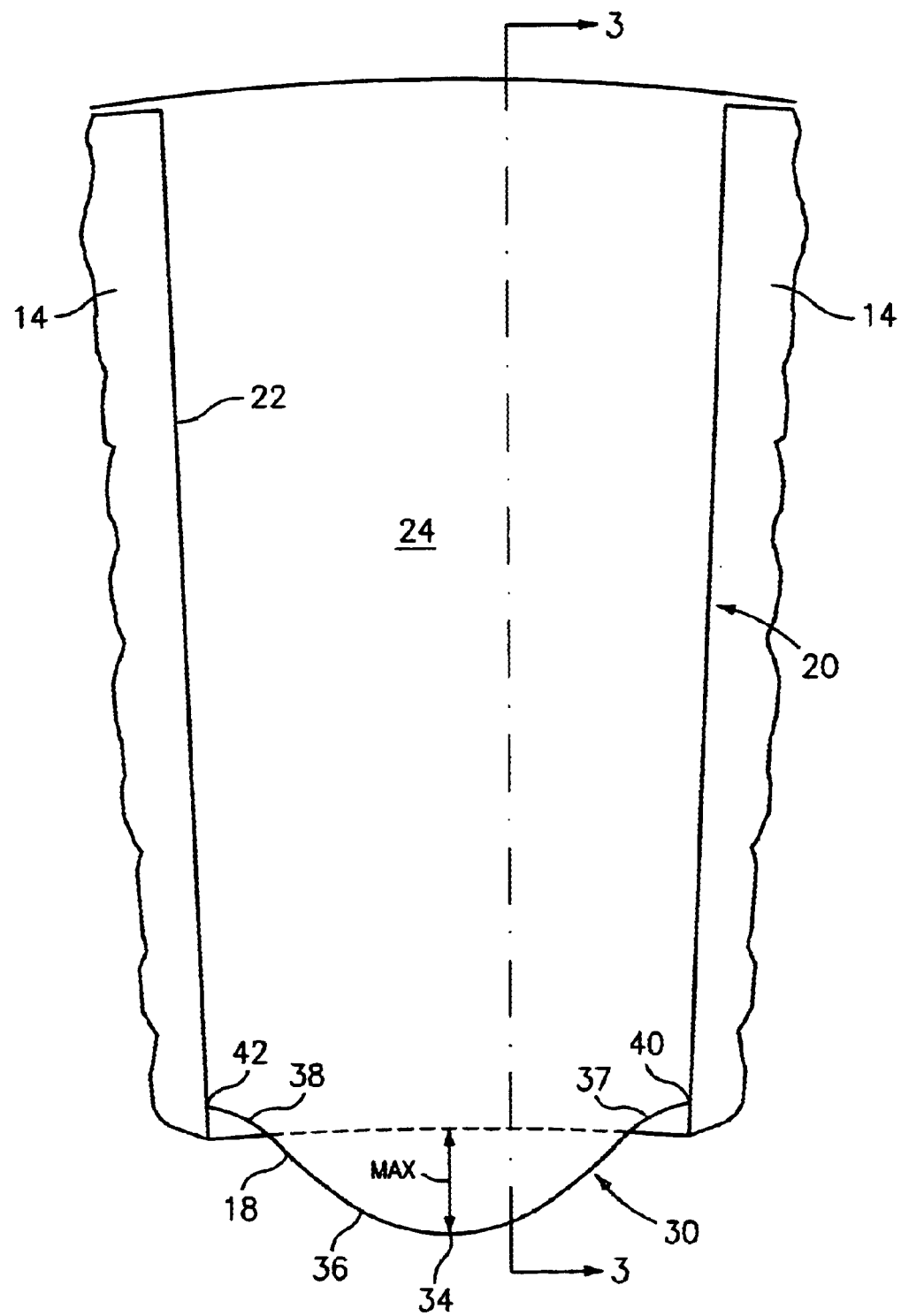
FIG. 2 is a sectional view taken along lines 2—2 in FIG. 1.
Figure 3:
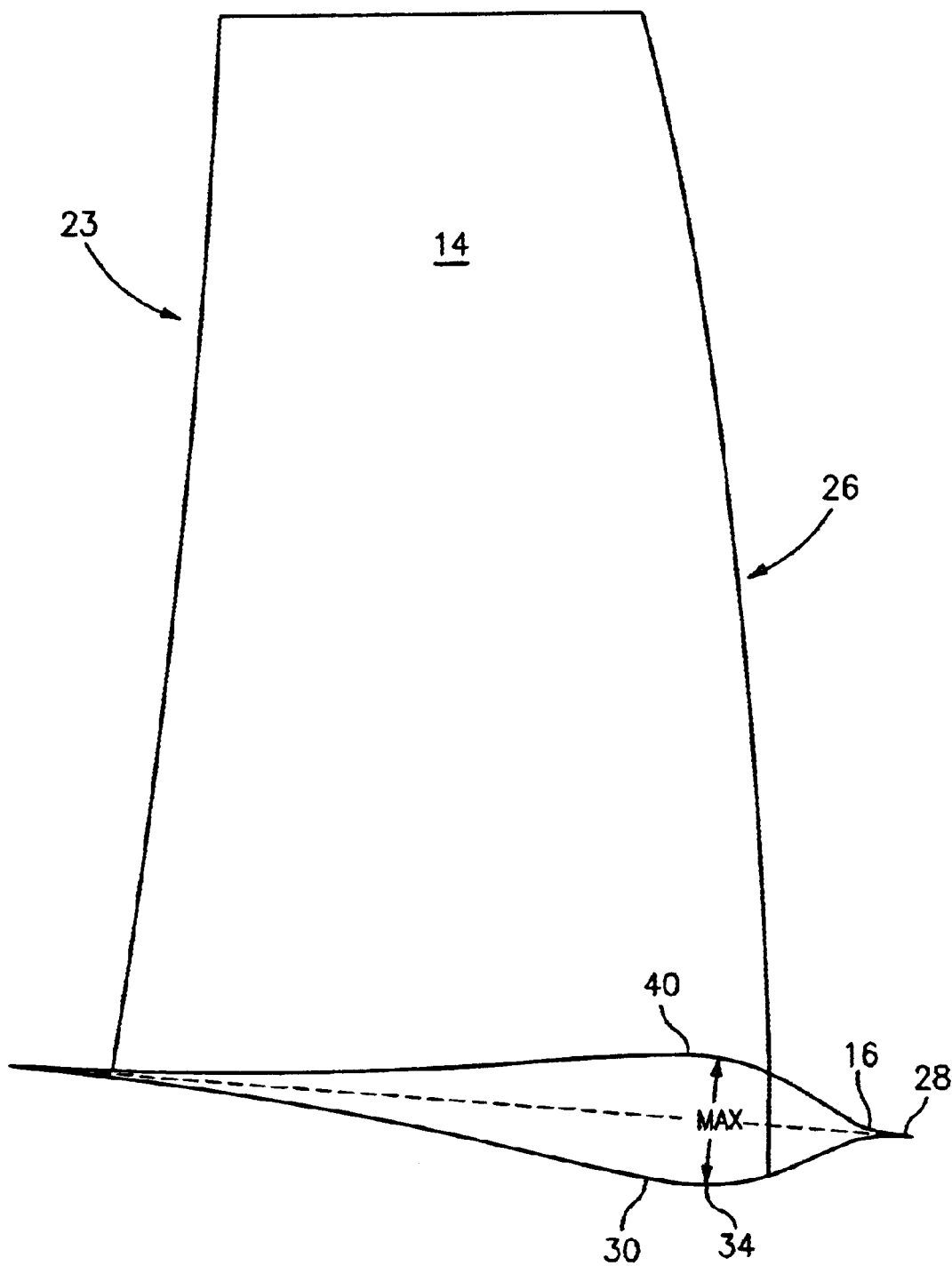
FIG. 3 is a sectional view taken along lines 3—3 in FIG. 2.
Figure 4:
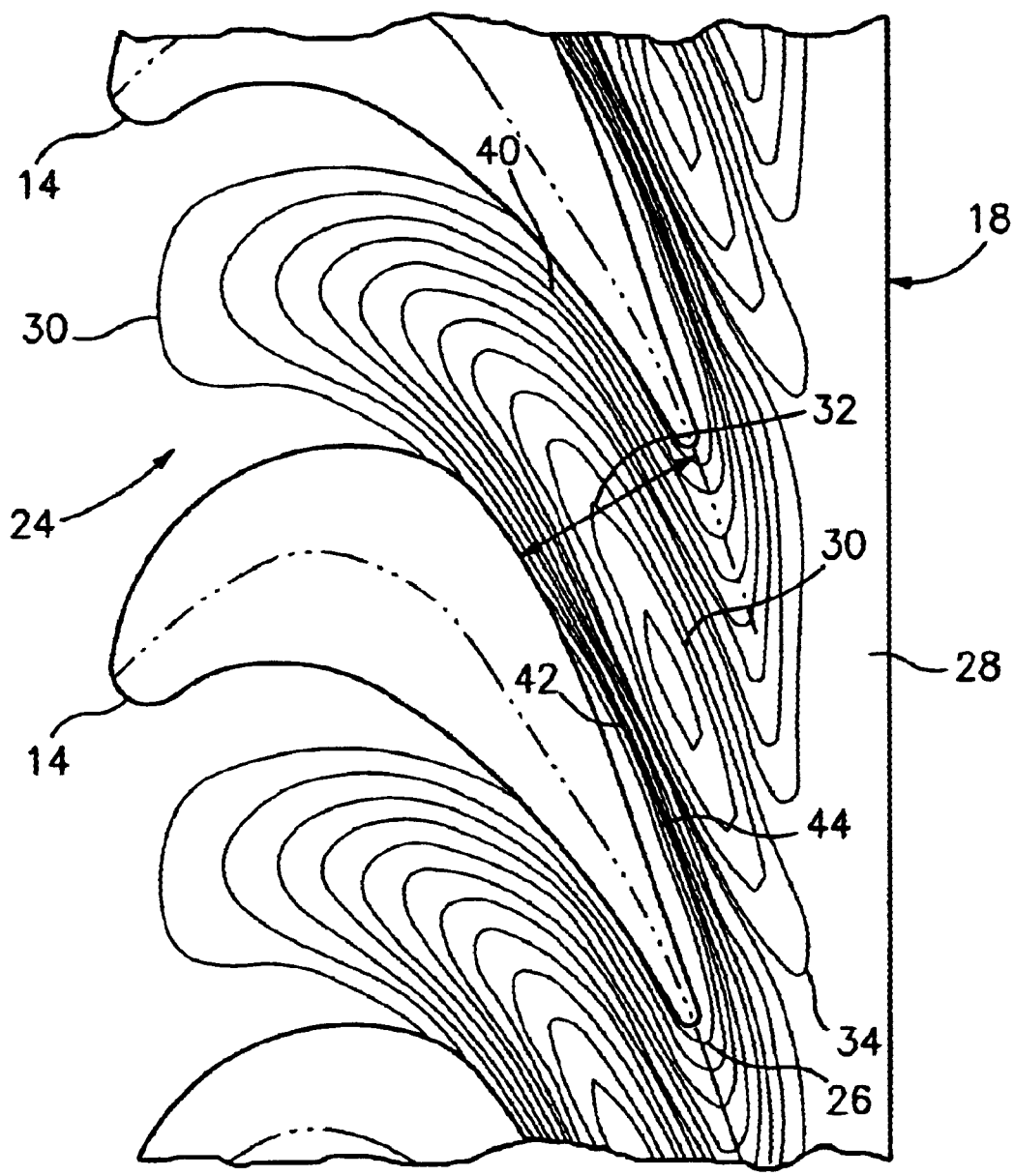
FIG. 4 is a sectional view taken along lines 4—4 in FIG. 3.

Referring now to FIGS. 2 through 4, the trough 30 has an amplitude or depth which is maximum (max) adjacent the axial location 32 of the flow passage throat. The actual maximum amplitude of a particular trough 30 varies depending upon the aerodynamics which are being sought. From the maximum amplitude point 34, the trough 30 preferably smoothly curves upwardly to a first point 40 where it blends into the pressure side 20 of a first one of the airfoils 14 and to a second point 42 where it blends into the suction side 22 of a second one of the airfoils 14. The lateral curvature of the trough 30 may include a central concave portion 36 and substantially convex portions 37 and 38. If desired, as shown in FIGS. 1 and 4, the trough 30 may have a tip to end curvature which is substantially identical to the curvature of a rear portion 44 of the suction side 22 of the airfoil 14.

If desired, the corner portion 39 of each platform 16 may be turned down slightly to blend with the trough 30 in an adjacent platform 16.

By incorporating the trough 30 into each platform 16, a reduction in shock strength and a reduced distortion in Mach number near the surface of the platform 16 occurs. Further, the shock/endwall interaction is minimized which results in a reduction in transverse Mach number distortions, a reduction in pressure losses, and an increase in efficiency. The trough minimizes the effects of shocks within and aft of the flow passage 24. The trough 30 may be incorporated into a wide variety of flow directing assemblies including, but not limited to, compressor stages of turbomachines and turbine stages of turbomachines.

It is apparent that there has been provided in accordance with the present invention an endwall shape which fully satisfies the object, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A flow directing assembly for use in a rotary machine comprising:

a plurality of blades, each said blade having an airfoil and a platform;

a plurality of flow passages defined by said airfoils of said blades;

each of said flow passages having an inner endwall defined by platforms of adjacent ones of said blades;

said inner endwall of each said flow passage having means for minimizing shock effects within and aft of each of said flow passages;

said shock effect minimizing means comprising a non-axisymmetric trough which extends from a point within said flow passage to a point aft of said flow passage; and said trough having an initial amplitude at a location adjacent a leading edge portion of said flow passage, a maximum amplitude adjacent a flow passage throat axial location, and a final amplitude at a downstream extent of said platform and wherein said initial and final amplitudes are less than said maximum amplitude.

2. A flow directing assembly according to claim 1, wherein each said trough is located in a portion of said platform associated with a respective blade.

3. A flow directing assembly according to claim 1, wherein each said airfoil has a suction side and each said trough has a curvature substantially identical to the curvature of a rear portion of said airfoil suction side.

4. A flow directing assembly according to claim 1, wherein said plurality of blades comprises a plurality of turbine blades.

5. A flow directing assembly according to claim 1, wherein said plurality of blades comprises a plurality of compressor blades.

6. An endwall shape for reducing shock strength on transonic turbomachinery airfoils having at least one flow passage defined by at least two airfoils comprising a non-axisymmetric trough extending from a leading edge portion of said at least one flow passage to a point near a trailing edge portion of said at least one flow passage and said non-axisymmetric trough has having a maximum amplitude near a passage throat axial location.

7. An endwall shape according to claim 6, wherein said trough has an initial amplitude at said leading edge portion and a final amplitude adjacent said point near said trailing edge portion and wherein both said initial amplitude and said final amplitude are less than said maximum amplitude.

* * * * *

UNITED STATES PATENT AND TRADEMARK OFFICE
CERTIFICATE OF CORRECTION

PATENT NO. : 6,669,445 B2 Page 1 of 1
DATED : December 30, 2003
INVENTOR(S) : J. Brent Staubach et al.

It is certified that error appears in the above-identified patent and that said Letters Patent is hereby corrected as shown below:

Column 4,
Line 11, delete "has".

Signed and Sealed this

Thirteenth Day of June, 2006

JON W. DUDAS
*Director of the United States Patent and Trademark Office*